US009374188B2

(12) United States Patent
Essiambre et al.

(10) Patent No.: US 9,374,188 B2
(45) Date of Patent: Jun. 21, 2016

(54) OPTICAL COMMUNICATION USING POLARIZED TRANSMIT SIGNAL

(75) Inventors: René-Jean Essiambre, Red Bank, NJ (US); Stefan Weisser, Nuremberg (DE); Peter J. Winzer, Aberdeen, NJ (US); Chongjin Xie, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2013 days.

(21) Appl. No.: 12/316,389

(22) Filed: Dec. 12, 2008

(65) Prior Publication Data

US 2010/0150559 A1 Jun. 17, 2010

(51) Int. Cl.
*H04B 10/00* (2013.01)
*H04J 14/06* (2006.01)

(52) U.S. Cl.
CPC .................................... *H04J 14/06* (2013.01)

(58) Field of Classification Search
USPC .................................................. 398/184, 189
See application file for complete search history.

(56) References Cited

U.S. PATENT DOCUMENTS 3,956,626 A * 5/1976 Ross .................... H04B 10/532 398/184
5,111,322 A * 5/1992 Bergano ................. G02B 6/272 385/1
5,703,708 A * 12/1997 Das ....................... H04J 14/083 250/227.12
6,634,808 B2 * 10/2003 Glingener ............ H04B 10/532 398/152
6,646,774 B1 * 11/2003 Willner .............. H04B 10/2572 359/246
6,714,742 B1 * 3/2004 Hayee .................. H04B 10/532 398/152
6,748,134 B2 * 6/2004 Bigo ....................... H04J 14/06 385/24
6,819,872 B2 * 11/2004 Farries ................. G02B 6/2861 398/102
7,120,364 B2 * 10/2006 Kovar .................. H04B 10/505 398/187
7,142,788 B2 * 11/2006 Price .................... H04B 10/505 398/184
7,280,764 B2 * 10/2007 Nishimura ........... H04B 10/532 398/152
7,317,877 B2 * 1/2008 Price .................... H04B 10/505 384/184

(Continued)

FOREIGN PATENT DOCUMENTS

WO 01 86849 A2 11/2001
WO 03052988 A2 6/2003
WO PCT/US2009/066670 3/2010

OTHER PUBLICATIONS

Van Den Borne, D., et al., "1.6-b/sHz Spectrally Efficient Transmission Over 1700 km of SSMF Using 40×85.6-Gb/s POLMUX-RZ-DQPSK", Journal of Lightwave Technology, vol. 25, No. 1, Jan. 2007, pp. 222-232.

(Continued)

*Primary Examiner* — Agustin Bello
(74) *Attorney, Agent, or Firm* — Eugene J. Rosenthal

(57) ABSTRACT

A WDM system having at least two channels, each of which employs two polarizations, is arranged so that the start times of symbols carried by one polarization of a channel are displaced in time from the start times of symbols carried by the other polarization of that channel, e.g., the start time for each symbol on one polarization is not substantially synchronized with the closest-in-time symbol start time on the other polarization of that channel. Preferably, the data signals are modulated using a return-to-zero (RZ) format and the start times of the symbols of the data signal carried by one polarization of a channel is offset from the start time of the symbols data signal carried by the other polarization of that channel by between 20% to 80%—preferably 50%—of the symbol period of the data signals, when the data signals have the same symbol period.

38 Claims, 5 Drawing Sheets

(56) References Cited

U.S. PATENT DOCUMENTS 7,620,326 B2 * 11/2009 Glingener ............... H04J 14/06 398/152
7,643,760 B1 * 1/2010 Han ..................... H04B 10/505 356/73.1
7,672,589 B2 * 3/2010 Gottwald ........... H04B 10/2572 398/152
7,715,730 B2 * 5/2010 Hecker .................. G02B 6/272 359/245
7,844,186 B2 * 11/2010 Dorrer ................. H04B 10/505 398/140
7,853,151 B2 * 12/2010 Izumi ................. H04B 10/2572 398/159
7,865,080 B2 * 1/2011 Hecker ................... H04J 14/02 398/152
2002/0003641 A1 * 1/2002 Hall ..................... H04B 10/532 398/65
2003/0108265 A1 * 6/2003 Rao ......................... H04J 14/06 385/11
2003/0175033 A1 * 9/2003 Taga ....................... H04J 14/06 398/152
2004/0208646 A1 10/2004 Choudhary et al.
2005/0213975 A1 9/2005 Gottwald et al.
2005/0265727 A1 * 12/2005 Glingener ............... H04J 14/06 398/152
2009/0274469 A1 11/2009 Yuki et al.
2010/0054738 A1 3/2010 Yuki
2010/0067914 A1 3/2010 Tanaka et al.
2010/0150559 A1 * 6/2010 Essiambre ............. H04J 14/06 398/79

OTHER PUBLICATIONS

JP 2005-531169A, Oct. 13, 2005 (US alleged equivalent is US 2005/0213975A1, Sep. 29, 2005).
JP 9-214471A, Aug. 15, 1997.
JP 11-55221A, Feb. 26, 1999.
JP 2003-249897A, Sep. 5, 2003 (Alleged US equivalent is US 2004/0208646 A1, Oct. 21, 2004).
JP 2010-68235A, Mar. 25, 2010 (Alleged US equivalent is US 2010/0067914 A1, Mar. 18, 2010).
JP 2009-272694, Nov. 19, 2009 (Alleged US equivalent is US 2009/0274469A1, Nov. 5, 2009).
JP 2009-204753, Sep. 10, 2009.
JP 2010-57106A, Mar. 11, 2010 (Alleged US equivalent is 2010/0054738 A1, Mar. 4, 2010).

* cited by examiner

101
LASER
103
PULSE CARVER
105
SPLITTER
107
109
111
DELAY
113
DATA 1
DATA MODULATOR
115
DATA 2
DATA MODULATOR
117
PC
121
PC
123
119
POLARIZATION BEAM COMBINER

301
LASER
103
PULSE CARVER
105
107
SPLITTER
109
111
DATA 1
DATA MODULATOR
115
DATA MODULATOR
117
DATA 2
PC
121
PC
123
119
POLARIZATION BEAM COMBINER
321
DELAY (PMF)

401
LASER
103
431
SPLITTER
DATA 1
DATA MODULATOR
115
DATA MODULATOR
117
DATA 2
PULSE CARVER
405
PULSE CARVER
425
413
DELAY
PC
121
PC
123
119
POLARIZATION BEAM COMBINER

OPTICAL COMMUNICATION USING POLARIZED TRANSMIT SIGNAL

TECHNICAL FIELD

This invention relates to optical communication, and more particularly, to optical communication using optical fibers.

BACKGROUND OF THE INVENTION

It is well known that the bandwidth of signals transmitted optically over fiber can be increased by using polarization division multiplexing. Unfortunately, when using a wavelength division multiplexed (WDM) signal in a nonlinear, i.e., conventional, fiber the polarizations of each optical channel can interfere with each other, e.g., due to nonlinear polarization scattering. Such interference effectively reduces either the bandwidth or the effective distance of communication that can be achieved by a fiber optic communication system employing such fiber.

SUMMARY OF THE INVENTION

In prior art WDM systems using polarization division multiplexing the respective data streams that are transmitted on each polarization have been synchronized in time, e.g., the start time for each symbol on each polarization is essentially the same. However, we have recognized that such synchronization has been disadvantageous, and has limited the bandwidth or distance that can be achieved by a WDM system using polarization division multiplexing with nonlinear fiber. Therefore, in accordance with the principles of the invention, a WDM system having at least two channels, each of which employs two polarizations, is arranged so that the start times of symbols carried by one polarization of a channel are displaced in time from the start times of symbols carried by the other polarization of that channel, e.g., the start time for each symbol on one polarization is not substantially synchronized with the closest-in-time symbol start time on the other polarization of that channel. Preferably, the data signals are modulated using a return-to-zero (RZ) format and the start times of the symbols of the data signal carried by one polarization of a channel is offset from the similar-in-time start times of the symbols data signal carried by the other polarization of that channel by 50% of the symbol period of the data signals, when the data signals have the same symbol period, although useful improvement can be achieved with different offsets, e.g., 20% to 80% of the symbol period. Advantageously, for example, using 50% offset can double the length of a fiber over which such a signal can be transmitted and effectively received by a conventional polarization division multiplexed receiver in a WDM system. Alternatively, the bandwidth of the transmitted signal may be doubled. The delay provided may be not only the aforementioned delay, but it may also include a further delay of an integral number of symbol periods.

Such a polarization multiplexed signal may be made for a channel by deriving from an initial laser signal two pulse trains that are out of phase with respect to each other, modulating a first of the pulse trains with one of the two data signals that are being transmitted and the second of the pulse trains with the other of the two data signals that are being transmitted, and combining a first polarization from the first modulated pulse train with the orthogonal polarization from the second modulated pulse train using a polarization beam combiner. Carving of the pulses may be achieved using a pulse carver, such as may be implemented through the employment of, for example, a Mach-Zehnder modulator or an electro-absorption modulator. Furthermore, an initial phase difference, e.g., 50% may be subsequently modified by a delay. Such a delay may be inserted either before the data is modulated onto the pulse stream or after the data is modulated onto the pulse stream. The data may be modulated using amplitude modulation or phase modulation, as well as a combination thereof.

In another embodiment of the invention, a polarization division multiplexed (PDM) RZ signal for a channel is developed in a conventional way, and then the two polarizations are offset from each other using a polarization maintaining fiber that has a different speed for each polarization.

In yet a further embodiment of the invention, an initial laser signal is first divided into two copies using a beam splitter, which may be a regular beam splitter or a polarization beam splitter. Each of the resulting copies of the laser signal has impressed upon it data in the form of RZ pulses, thereby forming modulated pulse streams. The data may be impressed and then the pulses carved, or vice-versa. Thereafter, one of the modulated pulse streams is delayed, and a first polarization developed from the delayed modulated pulse train is combined with an orthogonal polarization developed from the undelayed modulated pulse train using a polarization beam combiner.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

In the description, identically numbered components within different ones of the FIGs. refer to the same components.

Note that all the links shown herein may be implemented as optical fibers, waveguides, free space, or any other material conducive to the level of optical coupling required by the implementer, as appropriate for the particular implementation.

Figure 1:
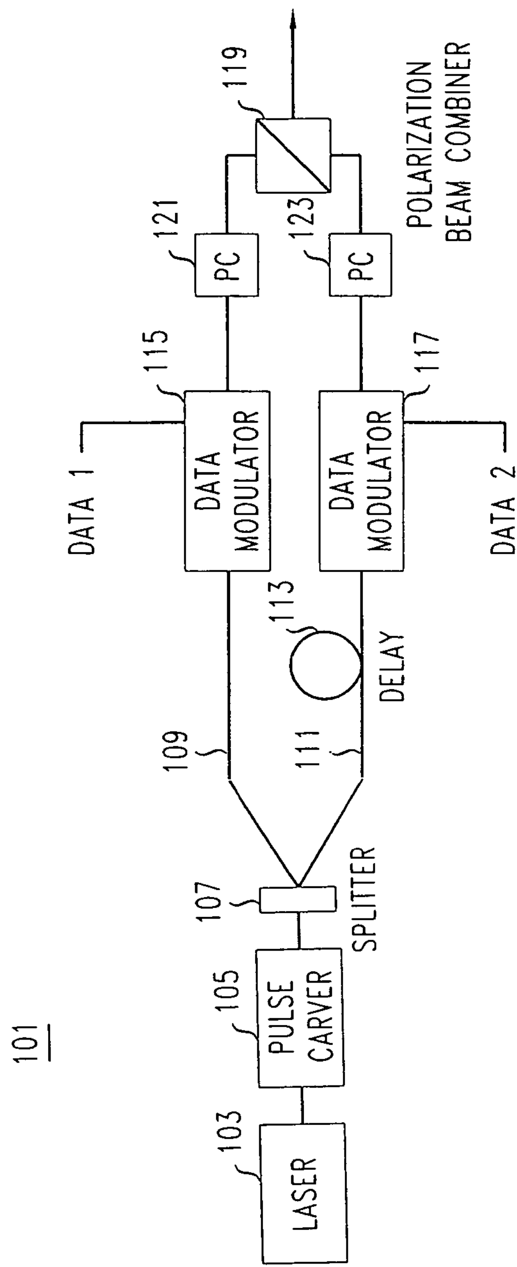
FIG. 1 shows exemplary transmitter, arranged in accordance with the principles of the invention, for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel.

FIG. 1 shows exemplary transmitter 101 which is arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel, e.g., the start time for each symbol on one polarization is not substantially synchronized with the closest-in-time symbol start time on the other polarization of that channel. Shown in FIG. 1 are a) laser 103, b) pulse carver 105, c) splitter 107, d) optical delay 113, e) data modulator 115, f) data modulator 117, g) polarization beam combiner 119, h) optional polarization controller (PC) 121, and i) optional polarization controller (PC) 123.

Laser 103 generates an optical carrier signal, i.e., an initial laser signal, so that the frequency of laser 103 defines an optical channel of the WDM system. As is well known by those of ordinary skill in the art, typically laser 103 generates only a single polarization. The optical carrier signal is supplied to pulse carver 105, which develops a pulse train, preferably in return-to-zero (RZ) format, that is supplied as an input to splitter 107. Carving of the pulses is conventional and may be implemented using, for example, a Mach-Zehnder modulator or an electro-absorption modulator.

Splitter 107, which is also conventional, creates two copies of the pulse train received from pulse carver 105. A first copy of the pulse train is supplied over link 109 to data modulator 115. A second copy of the pulse train is supplied over link 111 to delay 113. Delay 113 delays the pulse train it receives from splitter 107 and supplies the delayed pulse train to data modulator 117. Splitter 107 may, or may not, be polarization maintaining, depending on the particular splitter selected by the implementer.

Preferably, delay 113 delays each pulse of the pulse train supplied to it by 50% of the symbol period of the data signals which are to be carried, when the data signals have the same symbol period. Advantageously, for example, using such a 50% offset can double the length of a fiber over which such a signal can be transmitted and effectively received by a conventional polarization division multiplexed receiver in a WDM systems. Alternatively, the bandwidth of the transmitted signal may be, approximately, doubled as compared to the prior art in which there was substantially no delay in link between the signals arriving at data modulators 115 and 117. Should it be decided to do so, pulse carver 105 and data modulators 115 and 117 may be run at about twice the speed that they could be run when there was no delay in link between the signals arriving at data modulators 115 and 117. Note, however, that useful performance improvement can be achieved with different delays, e.g., 20% to 80% of the symbol period. Delay 113 may be a tunable delay, so that the delay employed may be set or changed in accordance with the particular system in which transmitter 101 is being employed. Delay 113 may be arranged to not only provide the aforementioned delay, but it may also provide in addition a further delay of an integral number of symbol periods.

Data modulator 115 receives as an input signal Data 1 and modulates the data onto the pulse train received from splitter 107 so as to produce a first data modulated pulse train. The data may be modulated using amplitude modulation or phase modulation, as well as a combination thereof. Data modulator 117 receives as an input signal Data 2 and modulates the data onto the pulse train received from delay 113 so as to produce a second data modulated pulse train, but the second data modulated pulse train is delayed, i.e., offset, from the first modulated pulse train. Again, the data may be modulated using amplitude modulation or phase modulation, as well as a combination thereof. There is no need for there to be any coordination between signals Data 1 and Data 2.

As will be appreciated by one of ordinary skill in the art, it is desired to have supplied from polarization beam combiner 119 a single WDM channel with two orthogonal polarizations that are each carrying their own respective data stream. To this end, in one arrangement, optional polarization controllers 121 and 123 are not included and polarization beam combiner 119 receives an input directly from each of data modulators 115 and 117. Within polarization beam combiner 119 one of the polarizations is rotated to be orthogonal to the other prior to the combination of the two beams into the output signal. Note that for this arrangement to be effective, the components in the optical chain prior to polarization beam combiner 119 must be polarization maintaining and laser 103 should supply a signal with only a single polarization.

Alternatively, when a) polarization beam combiner 119 does not have within it the ability to rotate the polarity of one of its input signals, b) all the components in the optical chain prior to polarization beam combiner 119 may not be polarization maintaining, and c) laser 103 supplies a signal with only a single polarization, it is necessary to adjust the polarization of the signal supplied from one or both of data modulators 115 and 117. The particular adjustment required depends on the nature of the components in the optical chain up to and including data modulators 115 and 117. For example, if laser 103 only supplies a single polarization and all the components in the optical chain up to and including data modulators 115 and 117 are polarization maintaining, then it is necessary to rotate the polarization of the output of only one of data modulators 115 and 117. This may be achieved by, for example, by employing only one of polarization controllers (PC) 121 and 123 to rotate the polarization of the output of the one of data modulators 115 and 117 from which it receives its input. For example, including only polarization controller 121 would rotate the output of data modulator 115 so that the version of the modulated data signal supplied to polarization beam combiner 119 from polarization controller 121 is rotated to be orthogonal with that supplied by data modulator 117. In an alternative example, including only polarization controller 123 would rotate the output of data modulator 117 so that the version of the modulated data signal supplied to polarization beam combiner 119 from polarization controller 123 is rotated to be orthogonal with that supplied by data modulator 115. Polarization controllers 121 and 123 may be conventional.

In the event that any of pulse carver 105 or splitter 107, or the coupling link therebetween, are not polarization maintaining, then it is necessary to adjust the polarization of the signal supplied from both of data modulators 115 and 117. If any of link 109 or data modulator 115 are not polarization maintaining, but all the other components in transmitter 101 are polarization maintaining, it is only necessary to employ polarization controller 121. Similarly, if any of link 111, delay 113, or data modulator 117 are not polarization maintaining, but all the other components in transmitter 101 are polarization maintaining, it is only necessary to employ polarization controller 123.

The first data modulated pulse train and the second modulated pulse train are combined by polarization beam combiner 119 so that, in accordance with the principles of the invention, the first modulated pulse train is transmitted via a first polarization of the optical channel of the WDM system defined by laser 103 and the second modulated pulse train which is delayed with respect to the modulated first pulse train is transmitted via a second polarization of the channel of the WDM system defined by laser 103.

Figure 2:
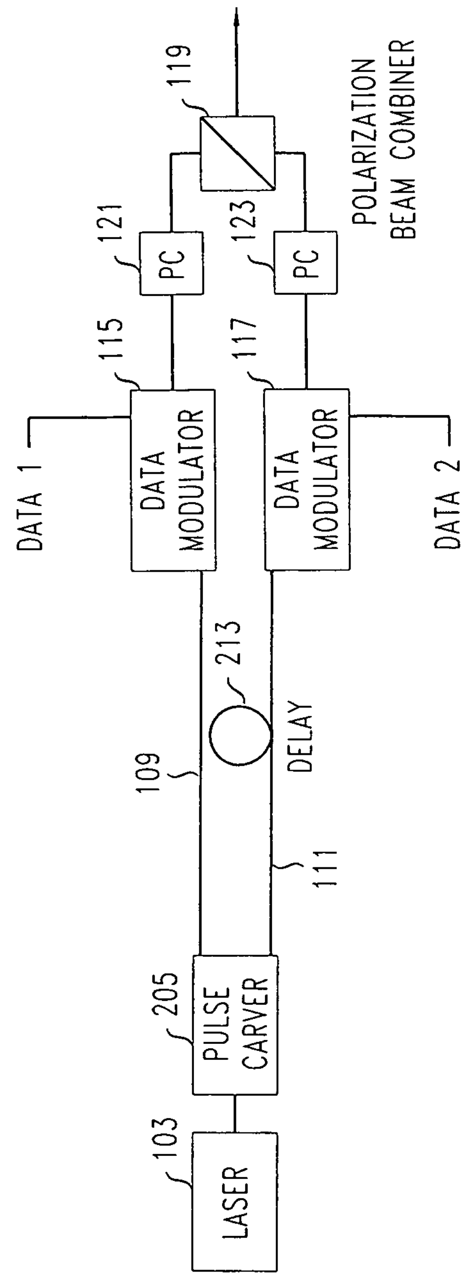
FIG. 2 shows exemplary transmitter, arranged in accordance with the principles of the invention, for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel.

FIG. 2 shows exemplary transmitter 201 which is arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel, e.g., the start time for symbols each of the polarizations of a channel are not substantially synchronized. Shown in FIG. 2 are a) laser 103, b) pulse carver 205, c) optional optical delay 213, d) data modulator 115, e) data modulator 117, f) polarization beam combiner 119, g) optional polarization controller (PC) 121, and h) optional polarization controller (PC) 123.

Laser 103 generates an optical carrier signal, i.e., an initial laser signal, so that the frequency of laser 103 defines an optical channel of the WDM system. The optical carrier signal is supplied to pulse carver 205. Pulse carver 205, which may be based on a Mach-Zehnder modulator, develops two return-to-zero (RZ) pulse trains that are out of phase, preferably by 50%. A first of the pulse trains is supplied over link 109 to data modulator 115. A second copy of the pulse train is supplied over link 111 to modulator 117. Optional optical delay 213, if inserted in the path between pulse carver 205 and modulator 117, delays the pulse train it receives from pulse carver 205 and supplies the delayed pulse train to data modulator 117. Thus, the total phase difference between the train of pulses arriving at data modulator 115 and data modulator 117 is the phase difference between the two outputs of pulse carver 205 combined with the delay of optional optical delay 213, if included. Optional optical delay 213 may be a tunable delay, so that the delay employed may be set or changed in accordance with the particular system in which transmitter 201 is being employed. Pulse carver 205 and delay 213 may be arranged so as to not only provide the aforementioned delay, but to also provide a further delay of an integral number of symbol periods.

Data modulator 115 receives as an input signal Data 1 and modulates the data onto the pulse train received from pulse carver 205 so as to produce a first data modulated pulse train. Data modulator 117 receives as an input signal Data 2 and modulates the data onto the pulse train received from delay 113 so as to produce a second data modulated pulse train, but the second data modulated pulse train is delayed, i.e., offset, from the first modulated pulse train, by the aforementioned delay between the signals arriving at data modulator 115 and data modulator 117.

As mentioned in connection with FIG. 1, it is desired to have supplied from polarization beam combiner 119 a single WDM channel with two orthogonal polarizations that are carrying their own respective data stream. To this end, in one arrangement, optional polarization controllers 121 and 123 are not included and polarization beam combiner 119 receives an input directly from each of data modulators 115 and 117. Within polarization beam combiner 119 one of the polarizations is rotated to be orthogonal to the other prior to the combination of the two beams into the output signal. Note that for this arrangement to be effective, the components in the optical chain prior to polarization beam combiner 119 must be polarization maintaining and laser 103 should supply a signal with only a single polarization.

Alternatively, when a) polarization beam combiner 119 does not have within it the ability to rotate the polarity of one of its input signals, b) all the components in the optical chain prior to polarization beam combiner 119 may not be polarization maintaining, and c) laser 103 supplies a signal with only a single polarization, it is necessary to adjust the polarization of the signal supplied from one or both of data modulators 115 and 117. The particular adjustment required depends on the nature of the components in the optical chain up to and including data modulators 115 and 117. For example, if laser 103 only supplies a single polarization and all the components in the optical chain up to and including data modulators 115 and 117 are polarization maintaining, then it is necessary to rotate the polarization of the output of only one of data modulators 115 and 117. This may be achieved by, for example, by employing only one of polarization controllers (PC) 121 and 123 to rotate the polarization of the output of the one of data modulators 115 and 117 from which it receives its input. For example, including only polarization controller 121 would rotate the output of data modulator 115 so that the version of the modulated data signal supplied to polarization beam combiner 119 from polarization controller 121 is rotated to be orthogonal with that supplied by data modulator 117. In an alternative example, including only polarization controller 123 would rotate the output of data modulator 117 so that the version of the modulated data signal supplied to polarization beam combiner 119 from polarization controller 123 is rotated to be orthogonal with that supplied by data modulator 115.

In the event that pulse carver 205 is not polarization maintaining, then it is necessary to adjust the polarization of the signal supplied from both of data modulators 115 and 117. If any of link 109 or data modulator 115 are not polarization maintaining, but all the other components in transmitter 201 are polarization maintaining, it is only necessary to employ polarization controller 121. Similarly, if any of link 111, delay 213, or data modulator 117 are not polarization maintaining, but all the other components in transmitter 201 are polarization maintaining, it is only necessary to employ polarization controller 123.

The first data modulated pulse train and the second modulated pulse train are combined by polarization beam combiner 119 so that, in accordance with the principles of the invention, the first modulated pulse train is transmitted via a first polarization of the optical channel of the WDM system defined by laser 103 and the second modulated pulse train is transmitted via a second polarization of the channel of the WDM system defined by laser 103.

Figure 3:
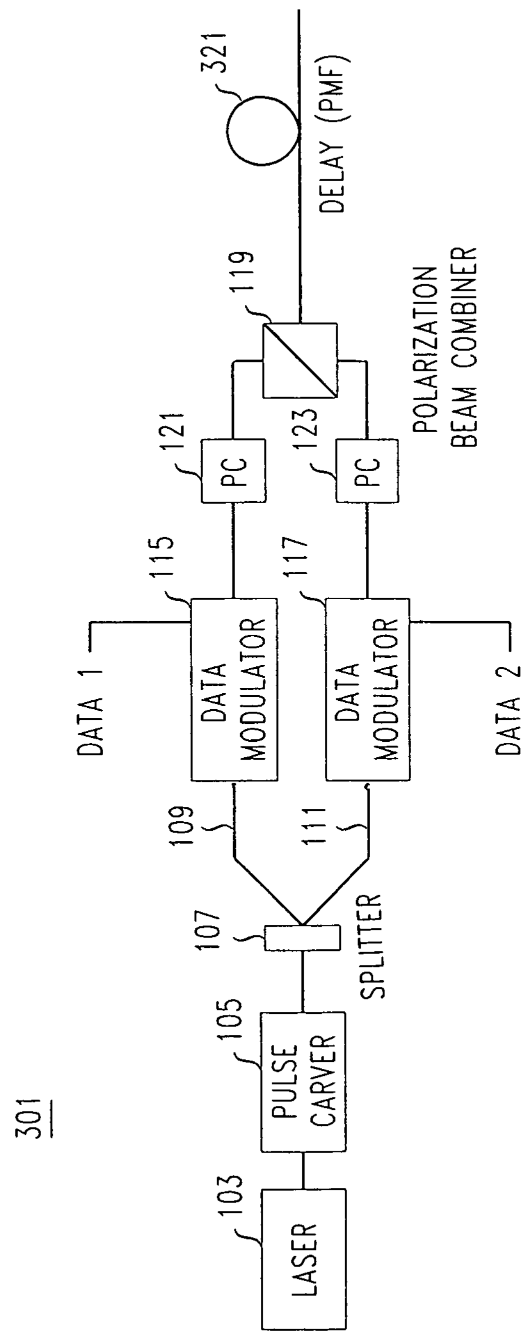
FIG. 3 shows a further exemplary transmitter 301 which is arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel.

FIG. 3 shows exemplary transmitter 301 which is arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel, e.g., the start time for symbols each of the polarizations of a channel are not substantially synchronized. Shown in FIG. 3 are a) laser 103, b) pulse carver 105, c) splitter 107, d) delaying fiber 321, e) data modulator 115, f) data modulator 117, and g) polarization beam combiner 119, h) optional polarization controller (PC) 121, and i) optional polarization controller (PC) 123.

Laser 103 generates an optical carrier signal, i.e., an initial laser signal, so that the frequency of laser 103 defines an optical channel of the WDM system. The optical carrier signal is supplied to pulse carver 105, which develops a pulse train, preferably in return-to-zero (RZ) format, that is supplied as an output to splitter 107. Carving of the pulses is conventional and may be implemented using, for example, a Mach-Zehnder modulator or an electro-absorption modulator. Splitter 107, which is also conventional, creates two copies of the pulse train received from pulse carver 105. A first copy of the pulse train is supplied over link 109 to data modulator 115. A second copy of the pulse train is supplied over link 111 to data modulator 117. Thus, in this embodiment of the invention, a delay need not yet be introduced between the two copies of the pulsed carved pulse trains.

Data modulator 115 receives as an input signal Data 1 and modulates the data onto the pulse train received from splitter 107 so as to produce a first data modulated pulse train. The data may be modulated using amplitude modulation or phase modulation, as well as a combination thereof. Data modulator 117 receives as an input signal Data 2 and modulates the data onto the pulse train received from splitter 107 so as to produce a second data modulated pulse train. Again, the data may be modulated using amplitude modulation or phase modulation, as well as a combination thereof.

Again, as mentioned in connection with FIG. 1, it is desired to have supplied from polarization beam combiner 119 a single WDM channel with two orthogonal polarizations that are each carrying their own respective data stream. To this end, in one arrangement, optional polarization controllers 121 and 123 are not included and polarization beam combiner 119 receives an input directly from each of data modulators 115 and 117. Within polarization beam combiner 119 one of the polarizations is rotated to be orthogonal to the other prior to the combination of the two beams into the output signal. Note that for this arrangement to be effective, the components in the optical chain prior to polarization beam combiner 119 must be polarization maintaining and laser 103 should supply a signal with only a single polarization.

Alternatively, when a) polarization beam combiner 119 does not have within it the ability to rotate the polarity of one of its input signals, b) all the components in the optical chain prior to polarization beam combiner 119 may not be polarization maintaining, and c) laser 103 supplies a signal with only a single polarization, it is necessary to adjust the polarization of the signal supplied from one or both of data modulators 115 and 117. The particular adjustment required depends on the nature of the components in the optical chain up to and including data modulators 115 and 117. For example, if laser 103 only supplies a single polarization and all the components in the optical chain up to and including data modulators 115 and 117 are polarization maintaining, then it is necessary to rotate the polarization of the output of only one of data modulators 115 and 117. This may be achieved by, for example, by employing only one of polarization controllers (PC) 121 and 123 to rotate the polarization of the output of the one of data modulators 115 and 117 from which it receives its input. For example, including only polarization controller 121 would rotate the output of data modulator 115 so that the version of the modulated data signal supplied to polarization beam combiner 119 from polarization controller 121 is rotated to be orthogonal with that supplied by data modulator 117. In an alternative example, including only polarization controller 123 would rotate the output of data modulator 117 so that the version of the modulated data signal supplied to polarization beam combiner 119 from polarization controller 123 is rotated to be orthogonal with that supplied by data modulator 115.

In the event that any of pulse carver 105 or splitter 107, or the coupling link therebetween, are not polarization maintaining, then it is necessary to adjust the polarization of the signal supplied from both of data modulators 115 and 117. If any of link 109 or data modulator 115 are not polarization maintaining, but all the other components in transmitter 301 are polarization maintaining, it is only necessary to employ polarization controller 121. Similarly, if any of link 111 or data modulator 117 are not polarization maintaining, but all the other components in transmitter 301 are polarization maintaining, it is only necessary to employ polarization controller 123.

The first data modulated pulse train and the second modulated pulse train are combined by polarization beam combiner 119 so that the first modulated pulse train is transmitted via a first polarization of the optical channel of the WDM system defined by laser 103 and the second modulated pulse train is transmitted via a second polarization of the channel of the WDM system defined by laser 103. Thereafter, one of the first and second modulated pulse trains is delayed with respect to the other, in accordance with an aspect of the invention. This may be achieved, for example, by supplying the combined signal to delay 321, which applies a relative delay between the two orthogonal polarizations. This may be achieved, for example, by employing as delay 321 a polarization maintaining fiber (PMF), which has a different speed for each polarization, and so delays the passage of one polarization mode more than the other. Thus, the two polarizations are offset from each. The offset may be in the range of 20% to 80% of the symbol period, and preferably, 50% thereof. In addition to the foregoing offset, the delay may also include an additional integral number of symbol periods.

Figure 4:
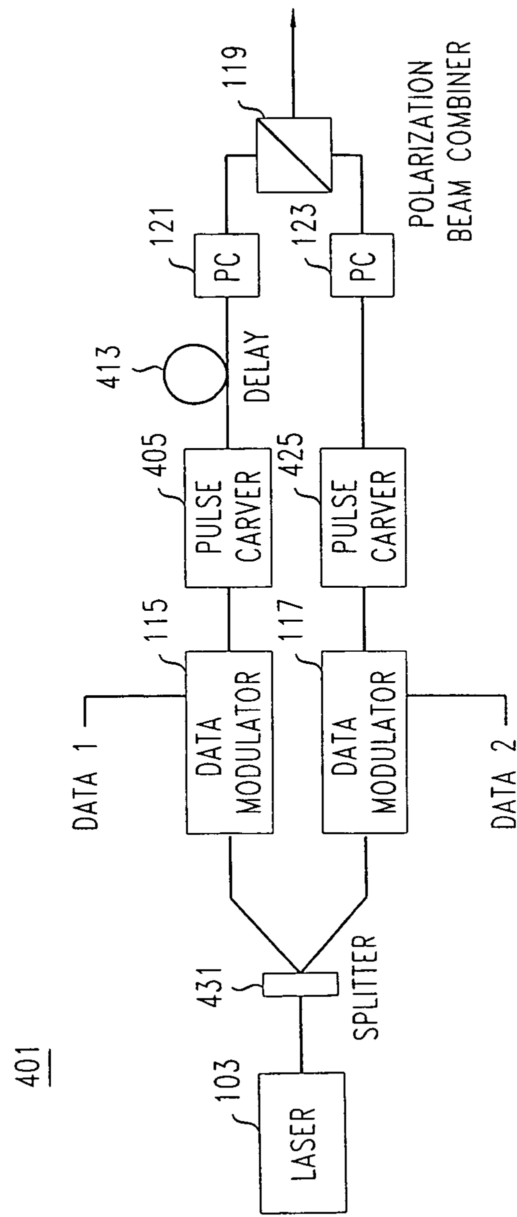
FIG. 4 shows yet a further exemplary transmitter which is arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel.

FIG. 4 shows exemplary transmitter 401, another exemplary embodiment of the invention, in which an initial laser signal is first divided into two copies using a beam splitter, which may be a regular beam splitter or a polarization beam splitter. Each of the resulting copies has impressed upon it data in the form of RZ pulses, thereby forming modulated pulse streams. The data may be impressed and then the pulses carved, or vice-versa. Thereafter, one of the modulated pulse streams is delayed, and a first signal from the delayed modulated pulse train is combined with a second signal from the undelayed modulated pulse train using a polarization beam combiner. Shown in FIG. 4 are a) laser 103, b) pulse carver 405, c) splitter 431, d) optical delay 413, e) data modulator 115, f) data modulator 117, g) polarization beam combiner 119, h) pulse carver 425, i) optional polarization controller (PC) 121, and j) optional polarization controller (PC) 123.

Laser 103 generates an optical carrier signal, i.e., an initial laser signal, so that the frequency of laser 103 defines an optical channel of the WDM system. The optical carrier signal is supplied to splitter 431, which is also conventional, and which creates two copies of the optical carrier signal from laser 103. Splitter 403 may, but need not be, a polarization beam splitter. In the even that splitter 403 is a polarization beam splitter, then each of the copies that are created by splitter 403 will be on a polarization that is orthogonal to the other. A first copy of the optical carrier signal is supplied to data modulator 115. A second copy of the optical carrier signal is supplied to data modulator 117.

Data modulator 115 receives as an input signal Data 1 and modulates the data onto the first copy of optical carrier signal from splitter 431 so as to produce a first data modulated optical carrier signal. The data may be modulated using amplitude modulation or phase modulation, as well as a combination thereof. Data modulator 117 receives as an input signal Data 2 and modulates the data onto the second optical carrier signal from splitter 431 so as to produce a second data modulated optical carrier signal. Again, the data may be modulated using amplitude modulation or phase modulation, as well as a combination thereof.

The first data modulated optical carrier signal is supplied from data modulator 115 to pulse carver 405 to produce a first modulated pulse train on the first polarization. The second data modulated optical carrier signal is supplied from data modulator 117 to pulse carver 425 to produce a second modulated pulse train on the second polarization. The first modulated pulse train from pulse carver 405 is supplied to optical delay 413, which delays it so that the pulses thereof are out of phase with corresponding pulses from pulse carver 425.

Again, as mentioned in connection with FIG. 1, it is desired to have supplied from polarization beam combiner 119 a single WDM channel with two orthogonal polarizations. To this end, in one arrangement, optional polarization controllers 121 and 123 are not included, splitter 431 is not a polarization beam splitter, and polarization beam combiner 119 receives an input directly from each of pulse carvers 405 and 425. Within polarization beam combiner 119 one of the polarizations is rotated to be orthogonal to the other prior to the combination of the two beams into the output signal. Note that for this arrangement to be effective, the components in the optical chain prior to polarization beam combiner 119 must be polarization maintaining and laser 103 should supply a signal with only a single polarization.

As noted above, if splitter 431 is a polarization beam splitter, each of the copies it creates will be on a polarization that is orthogonal to the other. To take advantage of this condition, all of the other components should be polarization maintaining components. As a result, there is no need for optional polarization controllers 121 and 123. Nor is there a need for polarization beam combiner 119 to be able to rotate one of the polarizations prior to its combining the two beams into the output signal.

Alternatively, when a) polarization beam combiner 119 does not have within it the ability to rotate the polarity of one of its input signals, b) all the components in the optical chain prior to polarization beam combiner 119 may not be polarization maintaining, c) laser 103 supplies a signal with only a single polarization, and d) splitter 431 is not a polarization beam splitter, it is necessary to adjust the polarization of the signal supplied from one or both of pulse carvers 405 and 425. The particular adjustment required depends on the nature of the components in the optical chain up to and including delay 413 and pulse carver 425. For example, if laser 103 only supplies a single polarization and all the components in the optical chain up to just before polarization beam combiner 119 are polarization maintaining, then it is necessary to rotate the polarization of the output of only one of pulse carvers 405 and 425. This may be achieved by, for example, by employing only one of polarization controllers (PC) 121 and 123 to rotate the polarization of the output of the one of delay 413 or pulse carver 425 from which it receives its input. For example, including only polarization controller 121 would rotate the output of delay 413 so that the delayed version of the modulated data signal supplied to polarization beam combiner 119 from delay 413 is rotated to be orthogonal with the modulated data signal supplied by pulse carver 425. In an alternative example, including only polarization controller 123 would rotate the output of pulse carver 425 so that the version of the modulated data signal supplied to polarization beam combiner 119 from polarization controller 123 is rotated to be orthogonal with that supplied by delay 413.

In the event that splitter 431 is not polarization maintaining, then it is necessary to adjust the polarization of the signal supplied from both delay 413 and pulse carver 425. If any of the components in the path from splitter 431 via data modulator 115 to polarization beam combiner 119 are not polarization maintaining, but all the other components in transmitter 401 are polarization maintaining, it is only necessary to employ polarization controller 121. Similarly, if any of the components in the path from splitter 431 via data modulator 117 to polarization beam combiner 119 are not polarization maintaining, but all the other components in transmitter 401 are polarization maintaining, it is only necessary to employ polarization controller 123.

The delayed first modulated pulses from optical delay 413 and the second modulated pulse train from pulse carver 425 are combined by polarization beam combiner 119. Although delay 413 is shown as being between pulse carver 405 and polarization beam combiner 119, delay 413 may alternatively be located between data modulator 115 and pulse carver 405. Further alternatively, delay 413 may be located between splitter 431 and data modulator 115. Delay 413 may not only introduce a delay of between 20% to 80%, preferably 50%, of the symbol period, but it may introduce in addition to such delay a delay of an integral number of symbol periods.

Figure 5:
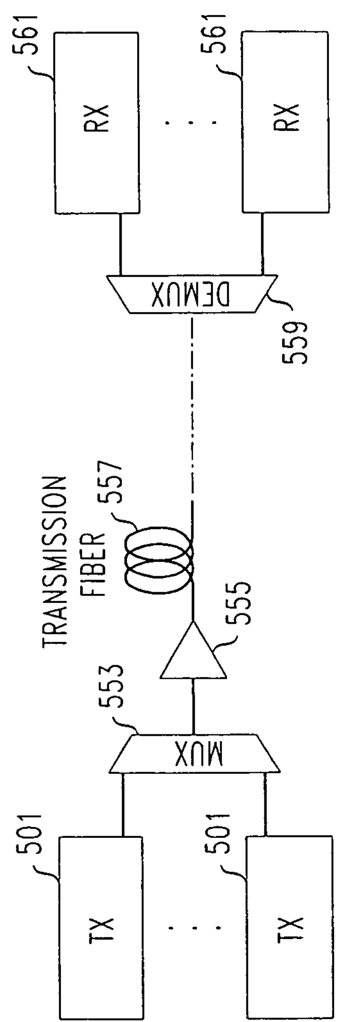
FIG. 5 shows an exemplary WDM network employing at least two transmitters that are arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel.

FIG. 5 shows an exemplary WDM network employing at least two transmitters (TX) 501 that are arranged in accordance with the principles of the invention for use in supplying the signal for one channel of a WDM system that has at least two channels wherein each of the channels employs two polarizations, and the signal of each of the at least two channels of the WDM system is such that the data that is carried by one polarization of a channel is displaced in time from the data carried by the other polarization of that channel. For example, each of transmitters 501 may be various ones of the type such as transmitters 101, 201, 301 or 401. Note that transmitters 501 need not be identical in terms of overall internal arrangement. For example, one of transmitters 501 may be similar to transmitter 101, while another of transmitters 501 may be similar to transmitter 401. Furthermore, the delay between the polarizations supplied by one of transmitters 501 may, but need not, be the same as that of the other of transmitters 501. Also shown in FIG. 5 are multiplexer (MUX) 553, amplifier 555, transmission fiber 557, demultiplexer (DEMUX) 559 and receivers (RX) 561. Each of multiplexer 553, amplifier 555, transmission fiber 557, demultiplexer 559 and receivers 561 may be conventional.

What is claimed is:

1. A transmitter for use in a wavelength division multiplexed system having at least two channels that are carried over a single fiber, said at least two channels each, respectively, employing two polarizations, said transmitter being adapted to offset a start time of a symbol of data that is carried by a first of said polarizations of a first of said at least two channels with respect to a starting-next-in-time symbol of data carried by a second of said polarizations employed by said first of said channels by less than a symbol period.

2. The invention as defined in claim 1 wherein said data signals of each of said at least two channels are modulated using a return-to-zero (RZ) format.

3. The invention as defined in claim 1 wherein a start time of a symbol of data that is carried by a first of said polarizations of a first of said at least two channels is offset by a time within the range of 20% to 80% of the symbol period with respect to said starting-next-in-time symbol of data carried by a second of said polarizations employed by said first of said channels.

4. The invention as defined in claim 1 wherein a start time of a symbol of data that is carried by a first of said polarizations of a first of said at least two channels is offset by 50% of the symbol period with respect to said starting-next-in-time symbol of data carried by a second of said polarizations employed by said first of said channels.

5. The invention as defined in claim 1 wherein said transmitter contains a polarization maintaining fiber which is adapted to cause said offset.

6. A transmitter for use in a wavelength division multiplexed system having at least two channels that are carried over a single fiber, said at least two channels each, respectively, employing two polarizations, said transmitter comprising:

a laser;

a pulse carver;

at least two data modulators;

an optical delay; and a polarization beam combiner;

which are arranged to form two polarizations for a first of said at least two channels, wherein start times of symbols that are carried by said first of said polarizations of said first of said at least two channels are displaced in time from start times of symbols that are carried by a second of said polarizations employed by said first of said channels by a fraction of a symbol time so that there is a partial overlap in time between symbols on each of said polarizations of said first of said at least two channels.

7. The invention as defined in claim 6 further comprising:

an optical splitter;

wherein said pulse carver is coupled to receive a laser signal supplied by said laser and to provide as an output pulses, said optical splitter generates two copies of said pulses received from said pulse carver, a first copy of said pulses being supplied to a first of said data modulators, a second copy of said pulses being supplied via said delay to a second of said data modulators, each of said data modulators modulating its received copy of said pulses with data to be transmitted via said first of said channels, and said modulated pulses being combined for transmission by said polarization beam combiner.

8. The invention as defined in claim 6 wherein said pulse carver is coupled to receive a laser signal supplied by said laser and provides as an output two copies of said pulses received from said pulse laser, a first copy of said pulses being supplied to a first of said data modulators, a second copy of said pulses being supplied via said delay to a second of said data modulators, each of said data modulators modulating its received copy of said pulses with data to be transmitted via said first of said channels, and said modulated pulses being combined for transmission by said polarization beam combiner.

9. The invention as defined in claim 6 further comprising:

an optical splitter;

wherein said pulse carver is coupled to receive a laser signal supplied by said laser and to provide as an output pulses, said optical splitter generates two copies of said pulses received from said pulse carver, a first copy of said pulses being supplied to a first of said data modulators, a second copy of said pulses being supplied a second of said data modulators, each of said data modulators modulating its received copy of said pulses with data to be transmitted via said first of said channels, said modulated pulses being combined for transmission by said polarization beam combiner; and wherein said optical delay is coupled to said polarization beam combiner so as to delay pulses of one of said polarizations with respect to pulses of said other of said polarizations.

10. The invention as defined in claim 9 wherein said optical delay is a polarization maintaining fiber.

11. The invention as defined in claim 6 further comprising:

a polarization beam splitter; and a second pulse carver;

wherein said polarization beam splitter is coupled to receive a laser signal supplied by said laser and to provide two polarized copies thereof, one copy to each of said data modulators, each of said data modulators modulating its received copy of said laser signal with data to be transmitted via said first of said channels and supplying said modulated laser signal to a respective one of said pulse carvers, each of said pulse carvers carving into pulses its respective received one of said modulated laser signals; and supplying said modulated pulses for combination and transmission by said polarization beam combiner.

12. The invention as defined in claim 6 further comprising at least one polarization controller adapted to rotate the polarity of one of said polarizations of first one of said at least two channels.

13. A transmitter for use in a wavelength division multiplexed system having at least two channels that are carried over a single fiber, said at least two channels each, respectively, employing two polarizations, wherein symbol periods of a data signal that is carried by a first of said polarizations of a first of said at least two channels is displaced in time from symbol periods of a data signal that is carried by a second of said polarizations employed by said first of said channels by a fraction of a symbol period.

14. The invention as defined in claim 13 further wherein said fraction of a symbol period is in the range of 20% to 80% of said symbol period.

15. The invention as defined in claim 13 further wherein said fraction of a symbol period is 50% of said symbol period.

16. A transmitter for use in a wavelength division multiplexed system having at least two channels that are carried over a single fiber, said at least two channels each, respectively, employing two polarizations, wherein start times of symbols representing data that are transmitted by said transmitter and carried by a first of said polarizations of a first of said at least two channels are displaced in time from start times of symbols representing data transmitted by said transmitter and carried by a second of said polarizations employed by said first of said channels wherein each of said symbols representing data that are transmitted by said transmitter and carried by said first of said polarizations of said first of said at least two channels partly overlaps in time with a symbol representing data transmitted by said transmitter and carried by said second of said polarizations employed by said first of said channels.

17. The invention as defined in claim 16 further comprising a polarization beam combiner for supplying contemporaneously on said first of said at least two channels at least a part of one of said symbols representing data that are carried by said first of said polarizations of said first of said at least two channels and at least a part of one of said symbols representing data that are carried by said second of said polarizations employed by said first of said channels.

18. The invention as defined in claim 17 wherein said polarization beam combiner combines said symbols that are carried by said first of said polarizations of said first of said at least two channels after they are displaced in time with respect to said symbols carried by said second of said polarizations employed by said first of said channels.

19. The invention as defined in claim 17 further comprising a polarization maintaining fiber for displacing in time said start times of said symbols that are carried by said first of said polarizations of said first of said at least two channels with respect to said start times of said symbols carried by said second of said polarizations employed by said first of said channels.

20. The invention as defined in claim 16 further wherein said data that is carried by said first of said polarizations of said first of said at least two channels and said data that is carried by said second of said polarizations employed by said first of said channels are each modulated using a return-to-zero format.

21. The invention as defined in claim 16 further wherein said displacement of start times of symbols representing data that are transmitted by said transmitter and carried by said first of said polarizations of said first of said at least two channels with respect to start times of symbols representing data that are transmitted by said transmitter and carried by said second of said polarizations of said first of said at least two channels is in the range of 20% to 80% of a symbol period.

22. The invention as defined in claim 16 further wherein said displacement of start times of symbols representing data that are transmitted by said transmitter and carried by said first of said polarizations of said first of said at least two channels with respect to start times of symbols representing data that are transmitted by said transmitter and carried by said second of said polarizations of said first of said at least two channels is about 50% of a symbol period.

23. The invention as defined in claim 16 wherein said transmitter further comprises a pulse carver for carving at least one pulse train from an initial laser signal, and wherein data that is carried by at least one of said polarizations of said first of said at least two channels is impressed on said at least one pulse train.

24. The invention as defined in claim 23 wherein said transmitter further comprises a data modulator for impressing said data that is carried by at least one of said polarizations of said first of said at least two channels onto said at least one pulse train.

25. The invention as defined in claim 23 wherein said transmitter further comprises a data modulator for impressing said data that is carried by at least one of said polarizations of said first of said at least two channels onto a delayed version of said at least one pulse train.

26. The invention as defined in claim 23 wherein pulse carver comprises a Mach-Zehnder interferometer.

27. The invention as defined in claim 23 further comprising a laser for supplying said initial laser signal.

28. The invention as defined in claim 23 wherein said initial laser signal defines said first of said at least two channels of said wavelength division multiplexed system.

29. The invention as defined in claim 16 wherein said symbols representing data that are transmitted by said transmitter and carried by a first of said polarizations of said first of said at least two channels have the same symbol period as symbols representing data transmitted by said transmitter and carried by said second of said polarizations employed by said first of said channels.

30. The invention as defined in claim 16 wherein said displacement in time of said start times of symbols representing data that are transmitted by said transmitter and carried by said first of said polarizations of a first of said at least two channels is with respect to a closest in time start time of a symbol representing data transmitted by said transmitter and carried by said second of said polarizations employed by said first of said channels.

31. A transmitter for use in a wavelength division multiplexed system having at least two channels that are carried over a single fiber, each of said at least two channels employing polarization division multiplexing, said transmitter comprising:

a first data modulator adapted to develop a first modulated optical signal carrying first data for transmission via at least a first polarization of at least a first of said channels;

a second data modulator adapted to developing a second modulated optical signal carrying second data for transmission via at least a second polarization of at least a first of said channels;

a combiner adapted to combine said first modulated optical signal placed onto said first polarization of said first of said channels with said second modulated optical signal placed onto said second polarization of said first of said channels; and a delay adapted to delay start times of symbols of said first modulated optical signal with respect to start times of symbols of said second modulated optical signal wherein each of said symbols representing data that are transmitted by said transmitter and carried by said first of said polarizations of said first of said at least two channels partly overlaps in time with a symbol representing data transmitted by said transmitter and carried by said second of said polarizations employed by said first of said channels.

32. The invention as defined in claim 31 wherein said combiner comprises a polarization beam combiner.

33. The invention as defined in claim 31 wherein said combiner comprises a polarization beam combiner with an ability to rotate the polarity of one of its input signals.

34. The invention as defined in claim 31 wherein said delay is adapted and located so as to delay said start times of symbols of said first modulated optical signal with respect to start times of symbols of said second modulated optical signal after said optical signal placed onto said first polarization of said first of said channels is combined with said second modulated optical signal placed onto said second polarization of said first of said channels.

35. The invention as defined in claim 34 wherein said delay is a polarization maintaining fiber.

36. The invention as defined in claim 31 wherein delay is adapted and located so as to delay said start times of symbols of said first modulated optical signal with respect to start times of symbols of said second modulated optical signal prior to said optical signal placed onto said first polarization of said first of said channels being combined with said second modulated optical signal placed onto said second polarization of said first of said channels.

37. The invention as defined in claim 31 further comprising a pulse carver adapted and located such that each of said first modulated optical signal carrying first data for transmission via at least a first polarization of at least a first of said channels and said second modulated optical signal carrying second data for transmission via at least a second polarization of at least a first of said channels are divided into pulses.

38. The invention as defined in claim 31 further comprising a laser that supplies a laser signal which defines said first of said channels.

* * * * *